May 24, 1927.
J. G. SWAIN
1,630,225
RESILIENT WHEEL
Filed June 25, 1921
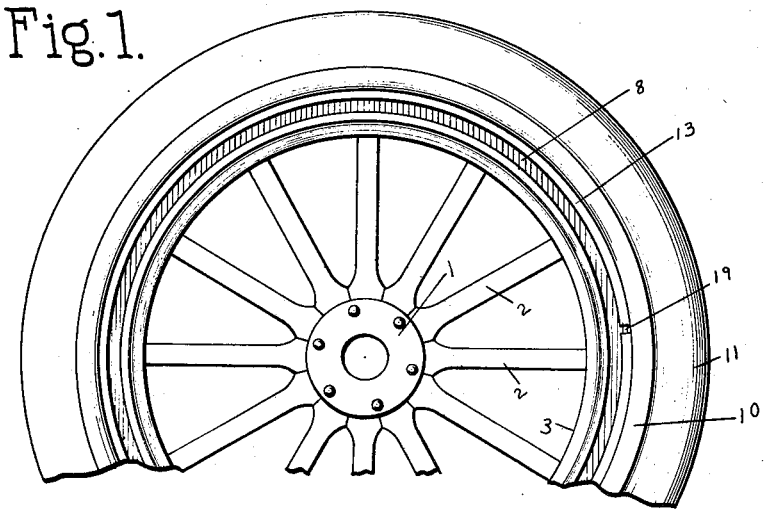
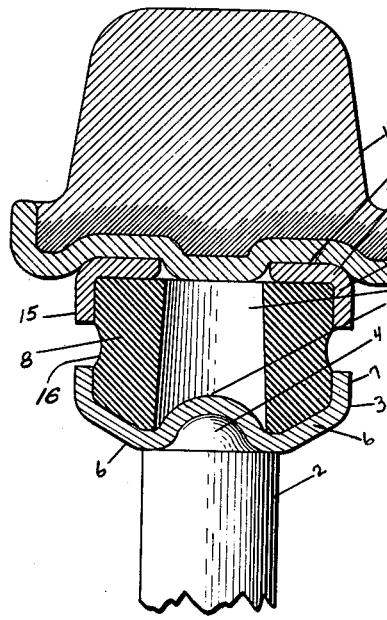
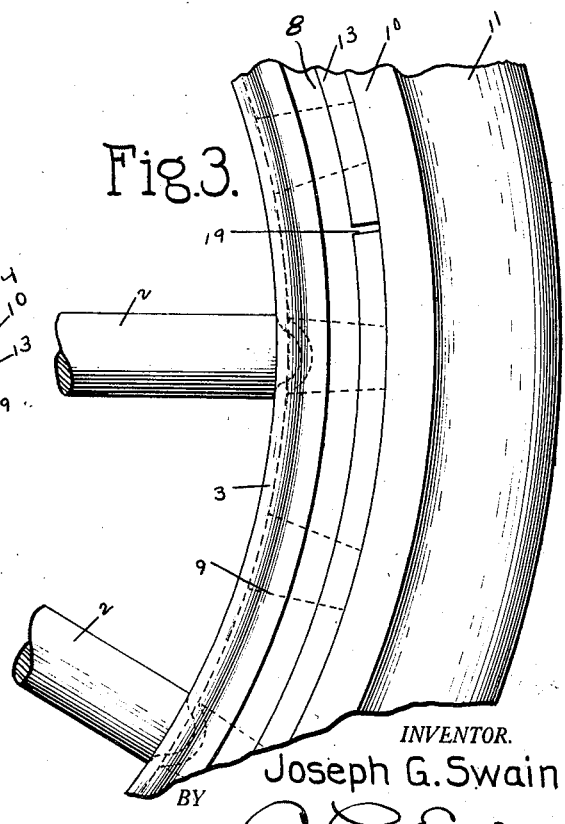
INVENTOR.
Joseph G. Swain
BY
ATTORNEY.

Patented May 24, 1927.

1,630,225

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

RESILIENT WHEEL.

Application filed June 25, 1921. Serial No. 480,333.

This invention relates to a wheel in which there is incorporated between the tire and the wheel hub a resilient or elastic member which is designed to take up or absorb some of the blows which are ordinarily transmitted from the resilient tire to the wheel structure.

I am aware of the fact that attempts have been made to incorporate a resilient shock absorbing strip within the wheel structure but such attempts have not been entirely successful owing to certain disadvantages which have not been overcome in the construction of the type of wheel.

The resilient wheel construction herein shown is designed to meet certain objections found in prior resilient wheels, it being the object of the invention to produce a simple and easily constructed and assembled wheel which will meet the requirements of a resilient wheel structure. It is also an object to prevent creeping or relative movement between the several elements of the wheel, it being my purpose to utilize certain features of a well known type of wheel structure for accomplishing this purpose.

Other objects and advantages will be apparent and it is my intention to cover such advances as have been made by me, without being limited to the exact design or form and proportions as shown herein.

In the drawings there is shown an embodiment of my invention in which

Fig. 1 is a side elevation of a portion of a wheel.

Fig. 2 is a transverse section taken at one of the spoke ends.

Fig. 3 is an enlarged view similar to Fig. 1 of a portion of the wheel.

The wheel comprises a hub 1 and a series of radial spokes 2 which hold a metallic felly-band or fixed rim 3. I provide in the base of the steel felloe a plurality of knobs or projections, which rise above the base of the fixed rim. These may be formed on or attached to the rim in any suitable manner. As shown herein I may form them as sockets or depressions 5 in which the ends 4 of the spokes are seated, the sockets or depressions 5 being formed by striking them up from the metal of the rim. The felly-band or fixed rim 3 is held on the spoke ends in any manner, the felly being shrunk or compressed upon the ends of the spokes if desired. At the sides of the spoke end holders or cups 5, the metallic fixed rim is inclined outwardly as at 6 and the edges of the fixed rim are flanged outwardly, as at 7.

Within the trough shaped fixed rim 3 is seated a band of rubber or other elastic material, 8, the band being confined by the parts 6 and 7. This band of rubber is provided with a plurality of recesses or apertures 9 which may extend radially through the entire depth of the band. These holes or recesses perform several functions. As shown in Figs. 2 and 3 certain of the recesses fit over the tenon cups or ends of the spokes and the band of rubber is thereby prevented from shifting or creeping about within the channel on the fixed rim. These holes also add to the resiliency of the elastic band and serve to ventilate it, preventing overheating of the rubber while the wheel is being run.

On the outer surface of the resilient band is a tire carrying rim 10 which has secured thereto a resilient tire 11. This rim may be secured to the outer surface of the resilient band by any preferred means. I have shown herein one style of mounting which will operate satisfactorily.

In the base of the tire carrying rim 10 there are formed a pair of channels or depressions 12 and in the channels are received clamping rings or bands 13, the transverse arms 14 of which accurately seat in the base of the tire carrying rim and the vertical or radial arms 15 of which extend down over the sides of the elastic band and prevent the rim from shifting laterally off the band 8. The outer edges of the flanges 7 and the inner edges of the flanges or arms 15 are spaced apart to allow a certain amount of movement between the wheel rim 6 and the tire carrying rim 10, the elastic band being grooved or cut away as at 16 to prevent pinching. The clamping rings are split as shown at 19, and may be sprung into place as will be understood. By means of this construction the tire carrying rim may be mounted on or demounted from the wheel.

The tire carrying rim is prevented from shifting about the wheel by the frictional engagement of the parts as shown.

The construction of wheel is simple and adequate for the purposes set forth. The wheel possesses resilience owing to the presence of the elastic band 8. The parts are prevented from slipping or creeping in the manner described. The holes 9 which are usually conical in the form shown, add to the resilience of the band, prevent it from creeping by co-operation with the spoke end sockets, and ventilate it to prevent overheating. The principles of the invention are not limited to a spoked wheel construction, but may be applied to solid wheels or wheels of any preferred design.

Other objects and advantages will appear and such as flow from the novel construction are highly useful in resilient wheel structures.

Claims:

1. In a resilient wheel structure, a fixed wheel rim, an elastic band on the fixed rim, a tire carrying rim having channels on its inner surface surrounding the elastic band and transversely split clamping rings between the band and the tire carrying rim, and seated in said channels.

2. In a resilient wheel construction, a fixed wheel rim, an elastic band on the fixed rim, a tire carrying rim having channels on its inner surface surrounding the elastic band and transversely split clamping rings, angular in cross section between the band and the tire carrying rim, and seated in said channels.

3. In a resilient wheel construction, a plurality of spokes, a fixed wheel rim on said spokes, a plurality of spoke end receiving sockets in the base of the fixed rim, an elastic band seated in the fixed rim, said band being formed with a plurality of holes passing through the band, which holes seat over the said sockets and an outer rim surrounding the elastic band.

4. In a resilient wheel construction, a plurality of spokes, a fixed wheel rim on said spokes, a plurality of spoke end receiving sockets, pressed up from the metal of the fixed rim, parallel flanges on said fixed rim, an elastic band seated in the fixed rim, a plurality of radial apertures through the band which apertures seat over the said sockets and an outer rim surrounding the elastic band.

5. In a resilient wheel construction, a plurality of spokes, a fixed wheel rim on said spokes, a plurality of spoke end receiving sockets, formed in the base of the fixed rim, outwardly extending flanges on the fixed rim, an elastic band seated in the fixed rim between the flanges, a plurality of holes passing radially through the band, certain of said holes seating over the sockets, an outer tire carrying rim surrounding the elastic band, said tire carrying rim having channels formed on its inner surface, and split angular clamping rings between the tire carrying rim and the elastic band, the horizontal portions of said rings being received in the channels and the vertical portions lying alongside of the elastic band.

JOSEPH G. SWAIN.